United States Patent Office 3,849,372
Patented Nov. 19, 1974

---

3,849,372
VISCOSITY-STABLE CHLOROPRENE SOL POLYMER
Joseph Burton Finlay, Wilmington, Del., assignor to E. I. du Pont de Nemours and Company, Wilmington, Del.
No Drawing. Filed Oct. 20, 1972, Ser. No. 299,433
Int. Cl. C08f 45/58
U.S. Cl. 260—45.95 R                    4 Claims

ABSTRACT OF THE DISCLOSURE

Instability of viscosity and color of chloroprene-containing sol polymers, polymerized in the presence of dialkyl xanthogen disulfides but substantially no free sulfur is overcome by stopping the polymerization before monomer conversion exceeds that at which all-sol polymer is obtained, adding a controlled proportion of a specified phenolic antioxidant, and thereafter isolating the sol polymer as a solid, non-emulsified product.

BACKGROUND OF THE INVENTION

1. Field of the Invention

This invention is in the field of improved polychloroprene elastomers.

2. Description of the Prior Art

Sol chloroprene polymers—that is, polymers which are soluble in benzene or toluene, when polymerized in the presence of short-chain dialkyl xanthogen disulfides (RXD) but substantially no free sulfur form vulcanizates which, when properly cured, have unusually high tensile strength. U.S. Pat. 3,347,837 to J. F. Smith, for instance, describes the preparation of such polymers which, however, contain carboxylic acid groups.

Unfortunately, the raw, uncured RXD-modified polymers have the disadvantage that they are somewhat less stable than lower-strength corresponding polymers polymerized in the presence of alkyl mercaptans. There is a tendency for the polymers to change in viscosity as they age. The polymer containing only traces of such stabilizers as phenothiazine, added to stop the polymerization, undergoes a decrease in viscosity through a minimum followed by a rapid increase. These changes are accompanied by discoloration of the polymer.

Obviously, such changes in viscosity and color of RXD-modified sol polymers are undesirable and there is a need for a practical way to eliminate them and to obtain uncured sol polymers of good stability which are curable to high strength vulcanizates.

SUMMARY OF THE INVENTION

Now according to the present invention it has been found that the foregoing disadvantages of RXD-modified chloroprene sol polymers can be overcome and sol polymers of excellent viscosity- and color-stability can be produced by processes in which a monomer containing chloroprene and optionally a minor proportion, i.e. up to 50% of another monomer free of carboxyl groups and copolymerizable with the chloroprene monomer, is polymerized in an alkaline aqueous emulsion containing a dialkyl xanthogen disulfide but substantially no free sulfur to a monomer conversion not exceeding that at which an all-sol polymer is obtained, stopping polymerization before exceeding said maximum conversion, adding 0.05 to 0.6 parts by weight, per 100 parts of polymer, of a phenolic antioxidant, and thereafter isolating the sol polymer as a solid, non-emulsified product the phenolic antioxidant being selected from the group consisting of (a) 2,6-dialkylphenols in which the alkyl radicals are acyclic or cyclic and contain up to 12 carbon atoms and at least one of the alkyl radicals is a tertiary radical, and (b) 2,2′-bis(6-tert-alkylphenols) in which the alkyl radical is cyclic or acyclic and contains 4 to 12 carbons atoms and the link between the two rings is a covalent bond or a divalent sulfur or aliphatic radical.

The product obtained according to this process is an uncured, solid, sol polymer of chloroprene, optionally containing a minor proportion of the copolymerizable monomer free of carbozyl groups, and has a Mooney viscosity of 25 or greater.

DESCRIPTION OF THE PREFERRED EMBODIMENTS

1. Preparation of the Polymer

The sol polymers which are improved according to this invention are solids—that is, they are neither fluids nor latexes. Their preparation is described, for instance in Hagman U.S. Pat. 3,686,156. They have a Mooney viscosity (ML 1 + 2.5/100° C.) of at least 25, which represents a molecular weight of at least 100,000. They are soluble in benzene. They can be prepared by processes with which the art is already familiar and which are described, for instance, in U.S. Pat. 3,042,652 to Pariser et al.; 3,147,317 to Jungk and Pariser; and 3,147,318 to Jungk, except that the polymerization is effected in the presence of a dialkyl xanthogen disulfide rather than an alkyl mercaptan.

The dialkyl xanthogen disulfides used for modifying the sol polychloroprene can be represented by the structure:

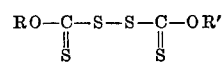

wherein R and R′ are alkyl radicals having one to eight carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1 to 4 carbon atoms.

The amounts of a particular dialkyl xanthogen disulfide used will vary somewhat with the molecular weight of the compound. However, for unknown reasons, there are small differences in modifying effectiveness among molecularly equivalent amounts of various dialkyl xanthogen disulfides. For this reason, the amount of dialkyl xanthogen disulfide is defined herein in terms of the effective amount of diethyl xanthogen disulfide, which effective amount ranges from about 0.1 to about 1 part per 100 parts of monomer. To determine the equivalent amounts of another dialkyl xanthogen disulfide, one may, for example, plot the Mooney viscosities of polymers prepared in the presence of varying amounts of the other dialkyl xanthogen disulfide and compare it with a similar plot prepared using varying amounts of diethyl xanthogen disulfide. The amounts of diethyl xanthogen disulfide called for (0.1 to 1 part per 100 parts of monomer) are those amounts which yield benzene-soluble chloroprene polymers having Mooney viscosities within a practical range. The preferred range of diethyl xanthogen disulfide is from 0.2 to 0.6 part.

The polymerization may be carried out in aqueous emulsion using a free-radical polymerization catalyst such as an alkali metal persulfate.

Various conventional emulsifying agents can be used in preparing the monomer emulsion. These include the water-soluble salts, particularly the sodium or potassium salts, of compounds of the following types: long-chain fatty acids; rosins or rosin derivatives, such as wood rosin, tall oil rosin, disproportionated rosins, or partially polymerized rosin; higher alcohol sulfates; and arylsulfonic acids such as alkylbenzenesulfonic acids and the condensation product of formaldehyde with a naphthalenesulfonic acid.

The concentration of organic monomer present in the starting emulsion is not critical. In general, 30 to 60 percent by weight, based on the total weight of the emulsion, is the range of concentrations of organic monomer used in the preparation of the polymer.

It is preferred that the pH be in the alkaline range.

The polymerization may be carried out between 0° C. and 80° C., preferably between 30° and 50° C.

Polymerization is stopped at a monomer conversion at which benzene-soluble polymer is obtained. The desirable point at which to stop polymerization will depend somewhat on the amount of alkyl xanthogen disulfide used, but, in general, will range from about 50% to about 80% conversion. Polymerization is stopped by use of conventional "short-stopping" agents such as are disclosed in U.S. Pat. 2,576,009. Unreacted monomer is removed by known methods, such as by steam stripping as disclosed in U.S. Pat. 2,467,769.

It is to be understood that up to 50% of the chloroprene can be replaced by another copolymerizable monomer. Examples of suitable comonomers are:

Vinyl aromatic compounds, such as styrene, the vinyl toluenes, and vinylnaphthalenes;

Aliphatic conjugated diolefin compounds such as 1,3-butadiene; isoprene; 2,3-dimethyl-1,3-butadiene; and 2,3-dichloro-1,3-butadiene.

Vinyl ethers, esters, and ketones, such as methyl vinyl ether, vinyl acetate, and methyl vinyl ketone;

Esters, amides, and nitriles of acrylic and methacrylic acids, such as ethyl acrylate, methyl methacrylate, methacrylamide, and acrylonitrile.

2. The Antioxidant

The antioxidant used in a process of the present invention generically is, as above stated, selected from the group consisting of:

(a) 2,6-dialkylphenols in which the alkyl radicals may be acyclic or cyclic and may contain up to twelve carbon atoms and at least one of the alkyl radicals is a tertiary radical.

(b) 2,2' - bis(6-tert-alkylphenols) in which the alkyl radical may be cyclic or acyclic and may contain 4 to 12 carbon atoms and the link between the two rings may be a covalent bond or a divalent sulfur or aliphatic radical. Suitable aliphatic radicals include saturated divalent hydrocarbon radicals containing up to twelve carbon atoms and which may also contain one or more oxygen or sulfur atoms in the form of ether or thioether linkages.

By "tertiary alkyl radical" is meant that the carbon attached to the phenol nucleus contains no hydrogen atom. The most commonly used tertiary alkyl radical is the tertiary butyl radical introduced into the ring by the reaction with isobutylene in the presence of an acidic catalyst. Other examples are the 1,1,3,3-tetramethylbutyl and 1,1,3,3,5,5-hexamethylhexyl radicals and 1-methylcyclohexyl radicals. The first two are often called, respectively, tert-octyl and tert-dodecyl radicals and are introduced by alkylating with isobutylene dimers or trimers.

The definition (a) includes both monohydric 2,6-dialkylphenols and bis-phenols in which the two 2,6-dialkylphenol nuclei are connected, usually in the 4-positions, by a linkage of the same type described for the compounds of definition (b).

The phenolic rings may additionally be substituted in positions other than the ortho positions with alkyl, hydroxyalkyl or alkoxyalkyl radicals, preferably with those radicals containing one to six carbon atoms, or with phenyl rings. The antioxidant should be free of basic nitrogen-containing groups because these react with the polychloroprene to produce discoloration and cross-linking.

Specific examples of suitable antioxidants include the following:
2,6-di-tert-butylphenoy
2,6-di-tert-butyl-p-cresol
2,6-di-tert-butyl-4-(hydroxymethyl)phenol
2,6-di-tert-butyl-4-(methoxymethyl)phenol
2,2,6-di-tert-butyl-4-phenylphenol
2,2'-methylenebis[6-(1-methylcyclohexyl)-p-cresol]
4,4'-thiobis[2-methyl-6-(1-methylcyclohexyl)phenol]
2,2'-methylenebis(6-tert-butyl-p-cresol)
2,2'-methylenebis(6-tert-butyl-4-ethylphenol)
4,4'-methylenebis(2,6-di-tert-butylphenol)
2,2'-methylenebis[6-(1-methylcyclohexyl)-p-creso]
2,2'-thiobis(6-tert-butyl-p-cresol)
4,4'-thiobis(6-tert-butyl-o-cresol)
4,4'-(oxydimethylene)bis(2,6-di-tert-butylphenol)
4,4'-(thiodimethylene)bis(6-tert-butyl-o-cresol)
4,4'-methylenebis[6-(1,1-dimethylpropyl)-o-cresol]
2,2'-methylenebis[6-(1,1,3,3-tetramethylbutyl)-p-cresol]
4,4'-thiobis(2-methyl-6-tert-butylphenol)
4,4'-thiobis[2-methyl-6-(1-methylcyclohexyl)phenol]
2,2'-thiobis(4-ethyl-6-tert-butylphenol)
6-tert-butyl-2,4-xylenol
2,2'-thiobis[4-amyl-6-(1,1,3,3-tetramethylbutyl)phenol]
2,2'-methylenebis[4,6-bis(1,1,3,3,5,5-hexamethylhexyl)-phenol]
2,2'-ethylidenebis[4-tert-butyl-6-(1,1,3,3-tetramethylbutyl)phenol]
4,4'-isopropylidenebis(2-tert-butyl-6-n-dodecylphenol)
4,4'-n-butylidenebis[2-methyl-6-(1-methylcyclohexyl)-phenol]
4,4'-n-dodecamethylenebis(2-tert-butyl-6-methylphenol)
2,2',6,6'-tetra-tert-butyl-p,p'-biphenol

3. Addition of Antioxidant

It is important that the antioxidant be added to the chloroprene polymer while it is still in latex form. The antioxidant is added as an emulsion, which may also contain polymerization arrestors such as phenothiazine, 4-tert - butylpyrocatechol, 2,5 - di-tert-butylhydroquinone, and the like. Alternatively the emulsion of antioxidant may be added to the latex after polymerization has been stopped.

At least 0.05 part by weight of antioxidant should be added per 100 parts of polymer in order to obtain satisfactory stability of the uncured polymer. There is usually no advantage to be gained in adding more than 0.6 part. The preferred amount is 0.2 to 0.4 part.

4. Examples

The invention will be better understood by reference to the following illustrative examples, in which parts and percentages are by weight unless otherwise specified.

In the examples the stability of the polymers is measured in the following ways:

(a) Change in Wallace plasticity during accelerated aging of the raw polymer while stored in air in the dark at 50° C.

The Wallace plasticity is a measure of the amount of flow or deformation under load of unvulcanized elastomeric materials. The sample to be tested is pressed into a sheet 0.15 inches (3.81 mm.) thick and cut into pellets. The test is made with a Wallace Plastimeter manufactured by H. W. Wallace and Co., Ltd., London. Initially, for a period of 10–15 seconds, the test pellet is compressed to a thickness of exactly 1 mm. and heated to 100° C. The test pellet is then subjected to a 10-kg. load for exactly 15 seconds at 100° C. The final thickness of the test piece, expressed in units of 0.01 mm., is the plasticity reading.

(b) Measurement of change in alkalinity of the polymer during the aging period.

Since degradation of the polymer is accompanied by loss of HCl, the decrease of alkalinity of the polymer is an indication of the amount of degradation which has occurred. Alkalinity is measured by dissolving a sample of the polymer in tetrahydrofuran and titrating with dilute aqueous hydrochloric acid or, if the polymer has become acidic, with dilute aqueous sodium hydroxide. In the Tables a positive figure represents the number of milliequivalents of acid per 100 grams of polymer required for neutralization. A negative figure indicates that the polymer has become acidic and gives the milliequivalents of sodium hydroxide per 100 grams of polymer.

(c) Discoloration and other appearances indicating degradation.

EXAMPLE 1

A series of polymers is prepared by polymerizing an emulsion of chloroprene using the following recipe:

| | Parts by Weight |
|---|---|
| Chloroprene | 100 |
| Disproportionated rosin (partially neutralized to an acid number of 140, Hercules "Resin 731–SA") | 3 |
| Diethyl xanthogen disulfide | 0.42 |
| Water | 95.0 |
| Sodium hydroxide | 0.55 |
| Sodium salt of condensate of formaldehyde and a naphthalene-sulfonic acid ("Lomar" PW, Nopco Chemical Co.) | 0.40 |

Polymerization is carried out at 40° C. in a nitrogen atmosphere. The pH of the emulsion is about 12. The catalyst is an aqueous solution containing 15% potassium persulfate and 0.075% sodium 2-anthraquinonesulfonate which is added as needed until the conversion of chloroprene is about 70%. The polymerization is stopped by adding an emulsion containing equal amounts (about 0.01 part per 100 parts of monomer) of phenothiazine and 4-tert-butylpyrocatechol. Unpolymerized monomer is removed by turbannular steam stripping. An emulsion containing the antioxidant to be tested is added in an amount to give 0.25 part of antioxidant per 100 parts of polymer. The latex is acidified to a pH of 5.6 with dilute acetic acid and the polymer is isolated on a freeze roll. The isolated polymer is dried at about 100° C. in a circulating air oven.

Wallace plasticity of the freshly prepared polymer is determined. Polymers are then aged in slabs about 0.25 inch in thickness in an air oven maintained at 50° C. Wallace plasticities are measured at intervals as shown in Table I. The alkalinities of the freshly prepared and aged polymers are also measured. In Table I the following abbreviations are used.

WP is Wallace Plasticity
Alk is milliequivalents of acid required for neutralization per 100 grams of polymer. A negative number indicates that the polymer has become acidic and gives the milliequivalents of dilute sodium hydroxide required for neutralization.

The following antioxidants are used:

A. 2,2',6,6'-tetra-tert-butyl-p,p'-biphenol
   (Ethyl Antioxidant 712)
B. 2,6-di-tert-butyl-α-methoxy-p-cresol
   (Ethyl Antioxidant 762)
C. 4,4'-methylenebis(6-tert-butyl-o-cresol)
   (Ethyl Antioxidant 720)
D. 2,2'-thiobis(6-tert-butyl-p-cresol)
   (CAO-6, Catalin Corp. of America)
E. 2,6-di-tert-butyl-4-phenylphenol
F. 2,6-di-tert-butylphenol
   (Ethyl Antioxidant 701)
G. 2,6-di-tert-butyl-p-cresol
   ("Ionol," Shell Chemical Co.)
H. 2,2'-Methylenebis(6-tert-butyl-p-cresol)
   (Antioxidant 2246, American Cyanamid Co.)
I. 4,4'-thiobis(6-tert-butyl-o-cresol)
   (Ethyl Antioxidant 736)
J. 4,4'-methylenebis(2,6-di-tert-butylphenol)
   (Ethyl Antioxidant 702)
K. 6-tert-butyl-2,4-xylenol
L. Control; no antioxidant The following are outside the class of usable antioxidants and are included for comparison purposes only.

M. 4-tert-butylphenol
N. 2,4-di-tert-butylphenol
O. 2,5-di-tert-butylhydroquinone
P. 4,4'-thiobis(2,6-di-sec-amylphenol)
   ("Santowhite" L, Monsanto)
Q. 4,4'-thiobis(6-tert-butyl-m-cresol)
   ("Santowhite" Crystals, Monsanto)
R. 4,4'-butylidenebis(6-tert-butyl-m-cresol)
   ("Santowhite" Powder, Monsanto)
S. 2,6-di-tert-butyl-α-dimethylamino-p-cresol
   (Ethyl Antioxidant 703)

TABLE I

| Antioxidant | Property | Weeks at 50° C. | | | | | | Weeks to first visible change | Appearance after 12 weeks |
|---|---|---|---|---|---|---|---|---|---|
| | | 0 | 2 | 4 | 6 | 8 | 12 | | |
| A | WP | 25.0 | 26.4 | 26.9 | 25.2 | 25.8 | 26.7 | 12 | Good, one pinhead spot. |
|   | Alk | 23 |  | 1.6 | 1.5 | 1.0 | 0.8 | | |
| B | WP | 25.0 | 26.1 | 25.6 | 24.1 | 24.6 | 24.0 | 12 | Good, 3 pinhead spots. |
|   | Alk | 2.2 |  | 1.5 | 1.3 | 1.0 | 0.3 | | |
| C | WP | 25.0 | 25.6 | 26.3 | 25.7 | 26.0 | 25.9 | 12 | Many small spots, one large. |
|   | Alk | 2.2 |  | 1.3 | 1.0 | 1.1 | 0.2 | | |
| D | WP | 24.9 | 25.4 | 26.0 | 24.4 | 25.0 | 25.2 | 8 | Good, many small spots. |
|   | Alk | 2.1 |  | 1.4 | 0.9 | 0.8 | −0.2 | | |
| E | WP | 25.0 | 25.2 | 25.3 | 23.7 | 23.1 | 23.1 | 12 (trace) | Many small spots. |
|   | Alk | 1.9 |  | 1.1 | 0.6 | 0.6 | −0.3 | | |
| F | WP | 25.0 | 25.0 | 24.6 | 22.4 | 21.3 | 20.9 | 12 | Soft, spots. |
|   | Alk | 2.2 |  | 1.3 | 1.0 | 0.7 | −0.3 | | |
| G | WP | 25.0 | 25.2 | 24.9 | 22.2 | 19.9 | 19.7 | 12 | Do. |
|   | Alk | 2.2 |  | 1.2 | 1.0 | 0.4 | −0.3 | | |
| H | WP | 25.0 | 26.0 | 27.0 | 25.8 | 26.1 | 28.5 | 12 | Good, many faint spots. |
|   | Alk | 2.0 |  | 1.4 | 0.9 | 0.8 | −0.25 | | |
| I | WP | 25.0 | 26.1 | 27.1 | 26.2 | 26.9 | 31 | 12 | Many small spots, one large. |
|   | Alk | 2.2 |  | 1.2 | 1.1 | 1.0 | −0.1 | | |
| J | WP | 25.0 | 25.4 | 24.9 | 22.7 | 21.6 | 26 | 8 (trace) | All dark. |
|   | Alk | 2.1 |  | 1.1 | 0.9 | 0.7 | −0.9 | | |
| K | WP | 25.1 | 25.2 | 24.4 | 22.5 | 19.9 | 18.5 | 12 | Soft, ½ dark. |
|   | Alk | 2.3 |  | 1.3 | 0.9 |  | −0.5 | | |
| L (control) | WP | 25.0 | 25.8 | 24.9 | 19.5 | 17.3 | 24–31 | 8 (turning dark) | All black. |
|   | Alk | 2.2 |  | 1.4 | 0.9 | 0.1 | −0.5 | | |
| M | WP | 25.0 | 25.4 | 24.3 | 19.0 | 17.7 |  | 8 (large spots) |  |
|   | Alk | 2.0 |  | 1.0 | 0.4 | 0.0 |  | | |
| N | WP | 25.0 | 25.4 | 24.1 | 20.8 | 18.9 | 22–24 | 6 (some spots) | Mostly dark. |
|   | Alk | 2.2 |  | 1.1 | 0.9 | −0.3 | −0.8 | | |
| O | WP | 25.0 | 25.2 | 24.4 | 19.5 | 17.5 |  | 8 (large spots) |  |
|   | Alk | 2.1 |  | 0.9 | 0.5 | −0.2 |  | | |
| P | WP | 24.9 | 25.3 | 24.3 | 21.1 | 19.5 | 27–37 | 8 (large spots) | All dark. |
|   | Alk | 1.9 |  | 1.1 | 0.5 | −0.2 | −0.6 | | |
| Q | WP | 25.0 | 26.8 | 27.5 | 25.3 | 31 |  | 6 (brown) | Black after 8 weeks. |
|   | Alk | 2.1 |  | 0.6 | −0.5 | −0.4 |  | | |
| R | WP | 25.0 | 25.0 | 20.9 | 28.4 | 31–35 |  | 4 (spotty brown) | All dark after 6 weeks. |
|   | Alk | 2.0 |  | −0.4 | −0.9 | −0.5 |  | | |
| S | WP | 25.2 | 26.2 | 25.7 | 24.3 | 24.2 | 31–36 | 6 (turning dark) | All dark. |
|   | Alk | 2.1 |  | 0.7 | 0.1 | −0.6 | −0.7 | | |

In the above table the antioxidants are listed in decreasing order of effectiveness. The control sample L containing no antioxidant other than the traces present in the short-stop emulsion shows a minimum plasticity after 8 weeks followed by a steep rise in viscosity, probably resulting from a cross-linking reaction which tends to make the polymer unsatisfactory for use. Samples R, N, P and Q show a similar undesirable increase in viscosity. Antioxidant S which contains an amino group begins to cure the polymer after about 8 weeks of aging. All the samples M through S show unsatisfactory aging properties with respect to color and maintenance of alkalinity. Sample M has no alkalinity and samples N through S are acidic after eight weeks of aging. The control contains only 0.1 milliequivalent of alkalinity per 100 grams of polymer after 8 weeks of aging.

EXAMPLE 2

An alkaline emulsion is prepared using the following recipe:

| | Parts by Weight |
|---|---|
| Chloroprene | 100 |
| Disproportionated rosin (partially neutralized to an acid No. of 140, Hercules "Resin 731–SA") | 3 |
| Diethyl xanthogen disulfide | 0.46 |
| Water | 89 |
| Sodium hydroxide | 0.54 |
| Sodium salt of condensate of formaldehyde and a naphthalenesulfonic acid ("Lomar" PW, Nopco Chemical Co.) | 0.39 |

Polymerization is carried out as in Example 1. Polymerization is stopped as in Example 1 except that 0.25 part of the antioxidant is added with the short-stop emulsion and in Samples 2 and 4 additional antioxidant is added after unpolymerized monomer has been removed. The Mooney viscosities of the isolated polymers are about 40.

The antioxidants used in the experiment are:

Antioxidant A—2,6-di-tert-butyl-4-phenylphenol
Antioxidant B—2,2'-methylenebis(6-tert-butyl-p-cresol)

The Wallace plasticities and alkalinities of the polymers are measured on freshly prepared samples and on samples which have been stored in an air oven at 50° C. for nine weeks.

Table II shows the results:

TABLE II

| Sample | 1 | 2 | 3 | 4 | 5 |
|---|---|---|---|---|---|
| Antioxidant | A | A | B | B | (1) |
| Amount of antioxidant | 0.25 | 0.50 | 0.25 | 0.50 | |
| Wallace Plasticity: | | | | | |
| Original | 22.9 | 22.7 | 22.2 | 22.3 | 21.7 |
| After 9 weeks | 20.8 | 21.0 | 25.3 | 24.7 | 16.0 |
| Alkalinity, meq./100 g.: | | | | | |
| Original | 2.0 | 2.3 | 1.9 | 2.1 | 2.1 |
| After 9 weeks | 1.0 | 0.9 | 0.5 | 0.2 | <0 |

¹ None (control).

After 9 weeks the control sample is black while the stabilized samples are either tan or show only a few areas of dark colored material.

I claim:

1. In a process for producing a chloroprene sol polymer having excellent viscosity stability and color stability, in which a chloroprene-containing monomer is polymerized in an alkaline aqueous emulsion containing a dialkyl xanthogen disulfide but substantially no free sulfur to a monomer conversion not exceeding that at which an all-sol polymer is obtained, the improvement which comprises stopping the polymerization before exceeding said maximum conversion, adding 0.05 to 0.6 parts by weight, per 100 parts of polymer, of a phenolic anti-oxidant, and thereafter isolating the sol polymer as a solid, non-emulsified product, the phenolic antioxidant being selected from the group consisting of (a) 2,6-disubstituted phenols in which the substituents are alkyl or cycloalkyl radicals and contain up to 12 carbon atoms and at least one of the alkyl radicals is a tertiary radical, and (b) 2,2'-bis(6-tert-substituted phenols) in which the substituents are alkyl or cycloalkyl radicals and contain 4 to 12 carbon atoms and the link between the two rings is a covalent bond or a divalent sulfur or aliphatic radical.

2. A process of claim 1 in which the chloroprene-containing mixture which is polymerized also contains a minor proportion of another copolymerizable monomer free of carboxyl groups.

3. A process of claim 1 in which there is added with the phenolic antioxidant a polymerization arrestor selected from the group consisting of phenothiazine; 4-tert-butyl-pyrocatechol; and 2,5-di-tert-butylhydroquinone.

4. A viscosity-stable chloroprene-containing sol polymer produced according to a process of claim 1.

References Cited
UNITED STATES PATENTS

| 3,686,156 | 8/1972 | Hagman | 260—92.3 |
| 3,347,837 | 10/1967 | Smith | 260—87.5 |
| 3,308,087 | 3/1967 | Garrett | 260—92.3 |
| 3,397,173 | 8/1968 | Collette et al. | 260—45.95 |
| 3,502,629 | 3/1970 | Strachan | 260—45.95 |

V. P. HOKE, Primary Examiner

U.S. Cl. X.R.
260—45.95 H, 45.95 C, 82.1, 85.5 ZA, 86.3, 87.5 R, 92.3, 45.9 QA